US009019728B2

(12) United States Patent
Matthews et al.

(10) Patent No.: US 9,019,728 B2
(45) Date of Patent: Apr. 28, 2015

(54) POWER CONVERTER OUTPUT VOLTAGE CLAMP AND SUPPLY TERMINAL

(71) Applicant: Power Integrations, Inc., San Jose, CA (US)

(72) Inventors: David Michael Hugh Matthews, Los Gatos, CA (US); Balu Balakrishnan, Saratoga, CA (US); Alex B. Djenguerian, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 30 days.

(21) Appl. No.: 13/791,695

(22) Filed: Mar. 8, 2013

(65) Prior Publication Data

US 2014/0254213 A1    Sep. 11, 2014

(51) Int. Cl.
*H02M 3/335* (2006.01)
*H02M 1/32* (2007.01)
*H02M 1/00* (2006.01)

(52) U.S. Cl.
CPC ............ *H02M 3/33523* (2013.01); *H02M 1/32* (2013.01); *H02M 2001/0003* (2013.01)

(58) Field of Classification Search
CPC ...................... H02M 3/335; H02M 2001/0032
USPC ............................ 363/21.13, 21.14, 21.15, 17
See application file for complete search history.

(56) References Cited

U.S. PATENT DOCUMENTS

| | | | |
|---|---|---|---|
| 4,612,610 A * | 9/1986 | Farnsworth et al. ....... | 363/21.13 |
| 5,162,970 A | 11/1992 | Davis, Jr. et al. | |
| 5,650,357 A | 7/1997 | Dobkin et al. | |
| 6,384,478 B1 | 5/2002 | Pour | |
| 6,998,952 B2 | 2/2006 | Zhou et al. | |
| 7,345,896 B2 * | 3/2008 | Dalal ......................... | 363/21.14 |
| 7,468,547 B2 | 12/2008 | Harvey | |
| 7,524,731 B2 | 4/2009 | Wang | |
| 7,619,297 B2 | 11/2009 | Wang | |
| 7,868,431 B2 | 1/2011 | Feng et al. | |

(Continued)

FOREIGN PATENT DOCUMENTS

JP    H09-260569    10/1997

OTHER PUBLICATIONS

"TNY284-290—TinySwitch™-4 Family: Energy-Efficient, Off-Line Switcher With Line Compensated Overload Power," Power Integrations, Inc., Sep. 2012 (26 pages).

(Continued)

*Primary Examiner* — Adolf Berhane
*Assistant Examiner* — Yemane Mehari
(74) *Attorney, Agent, or Firm* — Blakely Sokoloff Taylor & Zafman LLP

(57) ABSTRACT

A secondary control circuit includes a voltage regulator circuit to be coupled to an output of a power converter to provide a regulated power supply. One or more switched loads is coupled between a first terminal to be coupled to the output of the power converter and an output ground terminal. One or more comparator circuits is coupled to a second terminal coupled to receive an output sense signal. Each one of the one or more comparator circuits is coupled to receive a respective one of one or more reference signals. Each respective one of the one or more reference signals is a scaled representation of a first one of the one or more reference signals. Each one of the one or more switched loads is coupled to be switched in response to an output of a respective one of the one or more comparator circuits.

28 Claims, 3 Drawing Sheets

(56) References Cited

U.S. PATENT DOCUMENTS

| | | |
|---|---|---|
| 7,884,696 B2 | 2/2011 | Hébert et al. |
| 7,952,895 B2 * | 5/2011 | Matthews .................. 363/21.15 |
| 8,093,983 B2 | 1/2012 | Fouquet et al. |
| 8,772,909 B1 | 7/2014 | Vinciarelli |
| 2004/0214376 A1 | 10/2004 | Gibson et al. |
| 2005/0271148 A1 | 12/2005 | Dupuis |
| 2011/0101954 A1 * | 5/2011 | Lu et al. ........................ 323/313 |

OTHER PUBLICATIONS

"TL431, A, B Series, NCV431A, B: Programmable Precision References," Semiconductor Components Industries, LLC, Rev. 34, Apr. 2012 (18 Pages).

* cited by examiner

POWER CONVERTER OUTPUT VOLTAGE CLAMP AND SUPPLY TERMINAL

BACKGROUND INFORMATION

1. Field of the Disclosure

The present invention is related to power converters. More specifically, examples of the present invention are related to clamping the outputs of power converters.

2. Background

Switch mode power converters are widely used in power supplies for household or industrial appliances that require a regulated direct current (dc) source for their operation, such as for example battery chargers that are commonly used in electronic mobile devices. Off-line ac-dc converters convert a low frequency (e.g., 50 Hz or 60 Hz) high voltage ac (alternating current) input voltage to a required level of dc output voltage. Various types of switch mode power converters are popular because of their well-regulated output, high efficiency, and small size along with their safety and protection features. Popular topologies of switch mode power converters include flyback, forward, boost, buck, half bridge and full bridge, among many others including resonant types.

Under fault or transient load conditions, the output voltage of power converters can overshoot, potentially damaging the loads to which they are connected. In other configurations, if the regulation voltage is deliberately changed, which might occur for example if the regulated value of the output voltage is changed according to varying voltage requirements of different loads that may be connected to the output of the power converter, a sudden disconnection of the load can leave a high voltage remaining on the power converter output capacitor. The high voltage remaining on the output capacitor of the power converter could then damage a new load that is connected that is not designed to withstand the raised output voltage.

Techniques to clamp these output overvoltage conditions are typically imprecise, such as for example techniques that utilize Zener diodes, or consume excessive power because even slight variations in output voltage outside a regulated threshold value could lead to excessive clamp currents being drawn from the output of the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
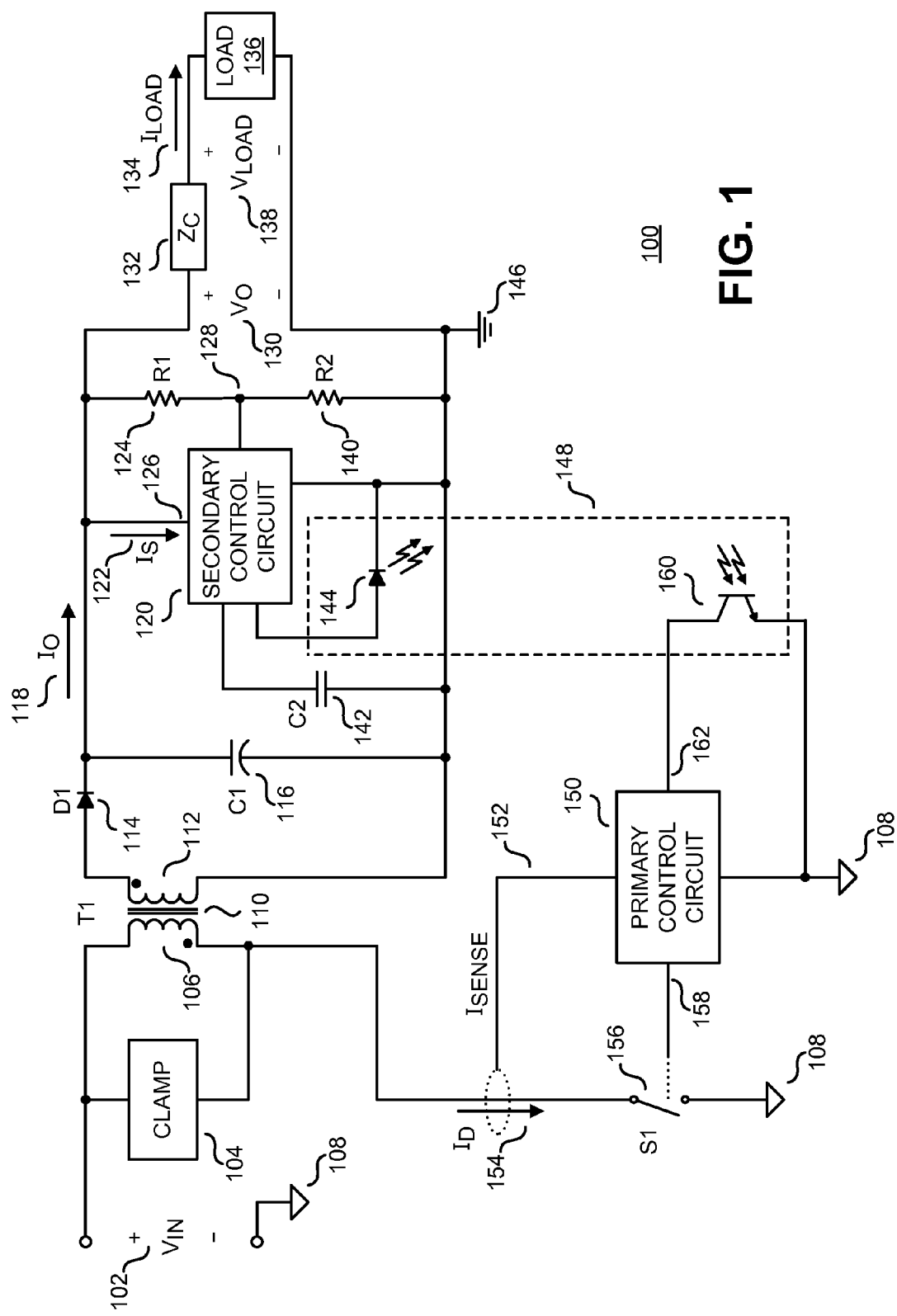
FIG. 1 is a schematic diagram of an example power converter including an example secondary control circuit having an output clamp and supply terminal in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As mentioned previously, techniques to clamp output overvoltage conditions are typically imprecise or consume excessive power. As will be discussed, an example secondary control circuit is disclosed, which provides a low consumption and precise clamp configuration and is not activated until the output voltage increases by a percentage above the normal regulation threshold of the power converter output in accordance with the teachings of the present invention. A power converter having a regulated output is often referred to as a regulated power supply.

To illustrate, FIG. 1 illustrates generally a schematic diagram of an example power converter 100 including an example secondary control circuit 120 with an output clamp and supply terminal in accordance with the teachings of the present invention. In one example, power converter 100 is coupled to provide power to an output load 136 through a cable 132 having an impedance $Z_C$. In the depicted example, power converter 100 includes an energy transfer element 110 having a primary winding 106 and a secondary winding 112. In the depicted example, energy transfer element 110 provides galvanic isolation between the input and the output sides of power converter 100. Galvanic isolation prevents dc current from flowing between the input side and the output side of the power converter 100, and is usually required to meet safety regulations. In one example, primary winding 106 is coupled to an input of a power converter, which is coupled to receive input voltage $V_{IN}$ 102. In one example, a clamp circuit 104 is coupled across primary winding 106 as shown. Secondary winding 112 is coupled to provide an output current $I_O$ 118 through an output diode D1 114 and an output voltage $V_O$ 130 across an output capacitor C1 116 to the output of power converter 100.

In the example depicted in FIG. 1, power converter 100 is a switched mode power converter and includes a power switch S1 156 coupled to the energy transfer element 110 and the input of the power converter through a primary ground reference 108. As shown, a primary control circuit 150 is coupled to power switch Si 156 to control the switching of power switch S1 156 to regulate a transfer of energy from the input of power converter 100 to the output of power converter 100. In one example, primary control circuit 150 is coupled to generate a drive signal 158 to control the switching of power switch 156 S1 to regulate the output of power converter 100 in response to a feedback signal 162. In the example, feedback signal 162 is representative of the output of power converter 100 and is coupled to be received by primary control circuit 150 through a feedback link 148 from a secondary control circuit 120, which is coupled to the output of power converter 100. In the depicted example, feedback link 148 is an isolated feedback link implemented with an opto-coupler including an LED 144 coupled to secondary control circuit 120 and a phototransistor 160 coupled to primary control circuit 150 as shown. It is appreciated that other examples of feedback links may be utilized in accordance with the teachings of the present invention, which provide galvanic isolation, such as for example inductive links or capacitive links instead of optical links. It is appreciated that the signal transmitted through the feedback link can be either a continuous signal of varying magnitude or a pulsed signal containing feedback information using binary or other coding systems that will be known to one skilled in the art.

As mentioned above, secondary control circuit 120 is coupled to the output of power converter 100. As will be discussed in further detail below, secondary control circuit 120 includes a first terminal 126 that is coupled to clamp the output of power converter 100 as well as provide a regulated power supply for secondary control circuit 120. In the illustrated example, secondary control circuit 120 also includes a second terminal 128 coupled to receive an output sense signal from an output sense circuit coupled to the output of the power converter 100. In the illustrated example, the output sense circuit includes an output resistor divider circuit coupled to the output of power converter 100 as shown. In the illustrated example, the output sense signal received at second terminal 128 from the resistor divider including resistor R1 124 and resistor R2 140 is representative of the output voltage $V_O$ 130 at the output of power converter 100. It is appreciated that in other examples resistors 124 and 140 could be integrated within secondary control circuit 120 while still benefiting from the teachings of the present invention. In the illustrated example, a bypass capacitor C2 142 is also coupled to secondary control circuit 120.

In various examples, there may be a variety of circumstances under which it is desired to adjust the regulation voltage of output voltage $V_O$ 130 in accordance with the teachings of the present invention. One example in which the regulation voltage of power converter 100 is deliberately adjusted may occur in circumstances in which there is a cable drop in voltage across the impedance $Z_C$ of cable 132 in response to the load current $I_{LOAD}$ 134 drawn by output load 136. In various examples, the cable drop in voltage across cable 132 may be compensated for by deliberately increasing the regulation voltage of power converter 100 in response to the load current $I_{LOAD}$ 134 and impedance $Z_C$ of cable 132 by the use of cable compensation circuitry. For instance, as the load current $I_{LOAD}$ 134 increases, the voltage drop across the impedance $Z_C$ of cable 132 increases. As a result, the output voltage $V_O$ 130 may be increased deliberately to compensate for the voltage drop across impedance $Z_C$ of cable 132 to increase the load voltage $V_{LOAD}$ 138 back up to the desired regulation voltage. However, a sudden decrease of the load 136 can cause a voltage that is higher than the specified maximum for the load. For example, if the load is initially at the maximum level (full load) the voltage $V_O$ will be increased by the cable compensation circuitry to compensate for the drop across the cable impedance $Z_C$. If the load 136 is now suddenly reduced to a negligible level, then the voltage drop across $Z_C$ will suddenly drop to negligible value and essentially the voltage $V_O$ 130 will appear across the load 136. This level of $V_O$ may be higher than the maximum level allowed for the load 136. It could take a long time for the capacitor C1 to discharge to levels that are within a safe range for the load due to negligible loading on the capacitor. Even if active loading were to be used as part of the cable compensation circuitry, the slow loop time constants associated with such circuitry could allow the voltage on the capacitor C1 to stay high for long periods of time and cause damage to the load.

In another example, there may be a variety of different types of interchangeable output loads 136 that may be coupled to the output of power converter 100. For instance, different interchangeable output loads 136 that are connected to power converter 100 may have different regulation voltage requirements. In these examples, the regulation voltage of power converter 100 is deliberately adjusted to accommodate the different output loads 136 that may be connected. However, a sudden disconnection of one output load 136 can leave a high voltage on the output capacitor C1 116 of power converter 100. The high voltage remaining on the output capacitor of the power converter could then damage another output load 136 that is subsequently connected, which is designed for a lower regulation voltage, and therefore cannot withstand the raised output voltage left behind by the previously connected output load 136.

In various examples, secondary control circuit 120 is coupled to clamp the output voltage $V_O$ 130 at first terminal 126 to address these issues by providing additional loading by drawing current $I_S$ 122 as needed from the output of the power converter 100 through first terminal 126 in accordance with the teachings of the present invention. In one example, the same first terminal 126 is also a supply terminal for secondary control circuit 120 in accordance with the teachings of the present invention. In one example, when additional loading is being applied to the output of the power supply through terminal 126, the total current $I_S$ 122 is in excess of the normal operating current of secondary control circuit 120.

Figure 2:
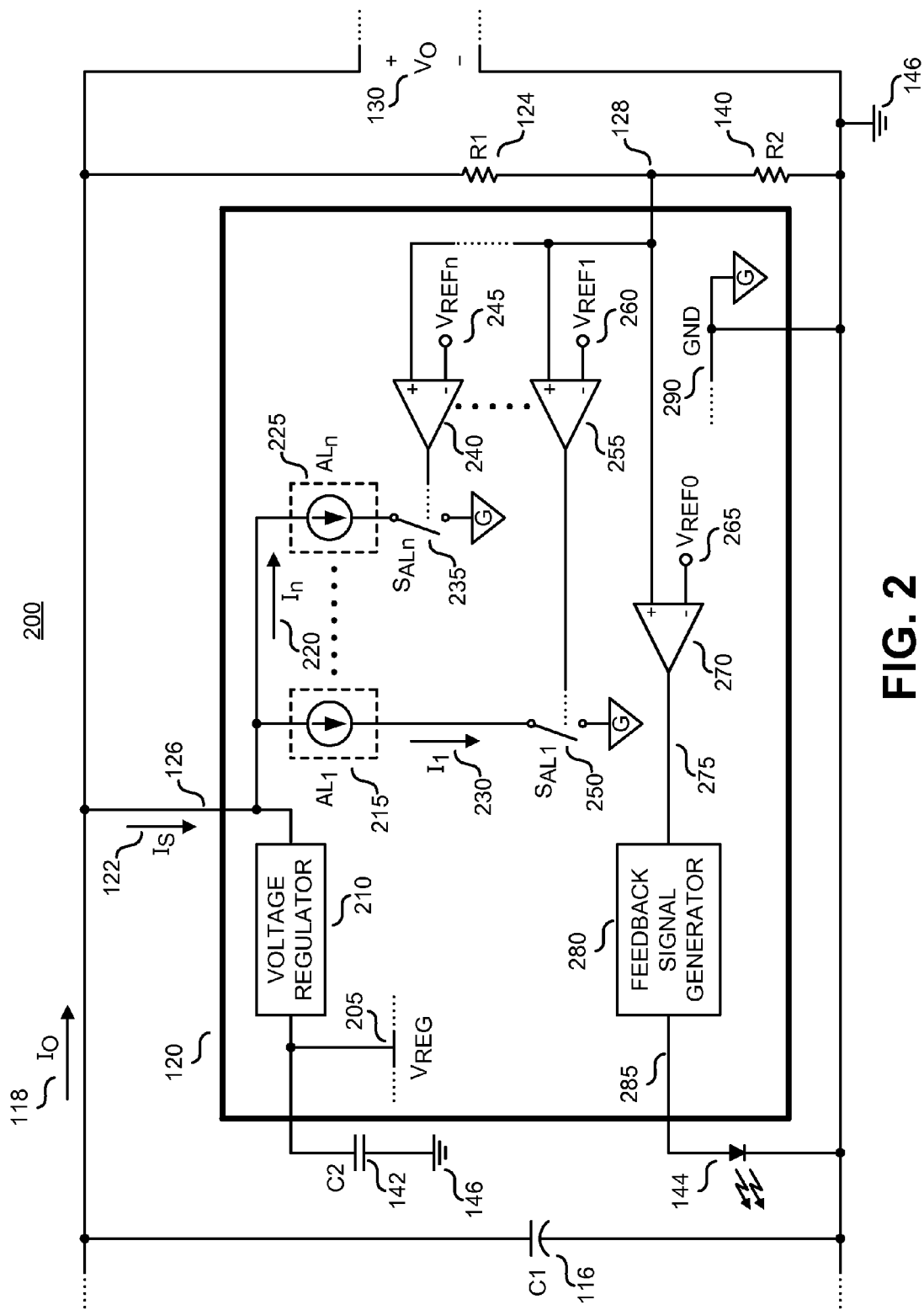
FIG. 2 is a functional block diagram of an example secondary control circuit including an output clamp and supply terminal in accordance with the teachings of the present invention.

To illustrate, FIG. 2 is a functional block diagram of an example secondary control circuit 120 of a power converter 200 including first terminal 126, which in the illustrated example is an output clamp and supply terminal in accordance with the teachings of the present invention. As shown in the depicted example, secondary control circuit 120 includes a voltage regulator circuit 210 coupled to first terminal 126. In the depicted example, the voltage regulator circuit 210 coupled to provide a regulated power supply $V_{REG}$ 205 of the secondary control circuit 120 from first terminal 126 in accordance with the teachings of the present invention. In one example, a bypass capacitor C2 142 is coupled to voltage regulator 210 at the terminal at which regulated power supply $V_{REG}$ 205 is provided as shown. One or more switched loads, which are illustrated in FIG. 2 as loads $AL_1$ 215 through $AL_n$ 225 are coupled between first terminal 126 and an output ground reference terminal G 290 of the power converter 100. In the illustrated example, each one of the one or more loads $AL_1$ 215 through $AL_n$ 225 is implemented with a current source. In the illustrated example, switch $S_{AL1}$ 250 is coupled to load $AL_1$ 215 to switch load $AL_1$ 215 to enable/disable current $I_1$ 230. Switch $S_{ALn}$ 235 is coupled to load $AL_n$ 215 to switch load $AL_1$ 215 to enable/disable current 220.

The example in FIG. 2 also illustrates one or more comparator circuits, which are illustrated in FIG. 2 as comparator 270, and comparators 255 through 240, which are coupled to a second terminal 128. In one example, the one or more comparator circuits includes hysteretic comparators. As mentioned previously, the second terminal 128 in one example is coupled to receive an output sense signal representative of an output voltage $V_O$ 130 of the power converter 200 through an output sense circuit. In the illustrated example, the output sense circuit includes a resistor divider including resistor R1 124 and resistor R2 140 as shown. In the example, each one of the one or more comparators 270, and comparators 255 through 240 is coupled to receive a respective one of one or more reference signals, which are illustrated in FIG. 2 as $V_{REF0}$ 265, and $V_{REF1}$ 260 through $V_{REFn}$ 245 as shown. In one example, each respective one of the one or more reference signals $V_{REF0}$ 265, and $V_{REF1}$ 260 through $V_{REFn}$ 245 is a scaled representation or a fixed percentage of a first one of the one or more reference signals $V_{REF0}$ 265. In one example, each one of the one or more switched loads $AL_1$ 215 through load $AL_1$ 215 is coupled to be switched by switches $S_{AL1}$ 250 through $S_{ALn}$ 235, respectively, in response to an output of a respective one of the one or more comparator circuits 255 through 240. For instance, the output of comparator 255 is coupled to switch $S_{AL1}$ 250 to enable/disable current $I_1$ 230 through load 215 in response to a comparison of $V_{REF1}$ 260 and the output sense signal representative of an output voltage $V_O$ 130 received from second terminal 128. Similarly, the output of comparator 240 is coupled to switch $S_{ALn}$ 235 to enable/disable current $I_n$ 230 through load 225 in response to a comparison of $V_{REFn}$ 245 and the output sense signal representative of an output voltage $V_O$ 130 received from second terminal 128.

As shown in the illustrated example, one of the one or more comparators 270 is coupled to receive one of the one or more reference signals $V_{REF0}$ 265 and the output sense signal representative of an output voltage $V_O$ 130 received from second terminal 128. In the example, the regulation voltage of the output voltage $V_O$ 130 power converter 200 is responsive to $V_{REF0}$ 265. The output 275 of comparator 270 is coupled to be received by a feedback signal generator 280, which is coupled to output a feedback signal 285 representative of the output voltage $V_O$ 130 of the power converter 200. As mentioned previously, in one example, feedback signal 285 is coupled to be received by primary control circuit 150 through an optocoupler including LED 144 as shown. The primary control circuit is coupled to control switching of power switch S1 156 in response to the feedback signal 285 to regulate the output voltage $V_O$ 130 of the power converter 200. It is appreciated that in other examples, comparator 270 could be replaced with a linear or non-linear amplifier to generate an error signal at output 275 whilst still benefiting from the teachings of the present invention. It is further appreciated that the polarity of the comparator or amplifier 270 inputs could be reversed such that $V_{REF0}$ is coupled to non-inverting input of comparator 270 and the feedback signal at terminal 128 is coupled to inverting input of comparator 270 by simply changing the logic of circuitry within feedback signal generator circuit 280.

In operation, secondary control circuit 120 utilizes the one or more reference signals $V_{REF1}$ 260 through $V_{REFn}$ 245, which are a scaled representation of reference signal $V_{REF0}$ 265. In the illustrated example, the one or more reference signals $V_{REF1}$ 260 through $V_{REFn}$ 245 may be an absolute value or fixed percentage(s) greater than the nominal power supply output voltage regulation reference signal $V_{REF0}$ 265. As shown in the depicted example, the output sense signal received at second terminal 128 is coupled to be received by each of the one or more comparators 270, and comparators 255 through 240. In another example, comparator 270 could be replaced by an error amplifier, depending on the type of feedback configuration and control technique used in the power converter 100. In another example, it is appreciated that the output sense signal received at second terminal 128 could utilize current rather than voltage thresholds to detect the output voltage $V_O$ 130 through second terminal 128.

In the illustrated example, the additional loads $AL_1$ 215 through $AL_n$ 225 with the additional reference signals $V_{REF1}$ 260 through $V_{REFn}$ 245 are utilized to introduce additional loading on the output of the power converter 100 by switching on one or more currents $I_1$ 230 through $I_n$ 220 when the one or more corresponding additional threshold reference signals $V_{REF1}$ 260 through $V_{REFn}$ 245 are exceeded. As shown in the example depicted in FIG. 2, when $V_{REF1}$ 260 is exceeded, the output of comparator 255 goes high and turns on switch $S_{AL1}$ 250, which enables current $I_1$ 230 to flow through load $AL_1$ 215 through current $I_S$ 122 from load current $I_O$ 118 from the output of power converter 100, thus providing additional loading to the output of power converter 100. If the output sense signal received at second terminal 128 increases further and exceeds reference signal $V_{REFn}$ 245, then the output of comparator 240 goes high and turns on switch $S_{ALn}$ 235, which enables current $I_n$ 225 to flow through load $AL_n$ 225 through current $I_S$ 122 from load current $I_O$ 118 from the output of power converter 100, thus further providing additional loading to the output of power converter 100 in accordance with the teachings of the present invention. In other examples, each one of the one or more loads $AL_1$ 215 through $AL_n$ 225 may be implemented with a resistor or the like to provide the additional loading in accordance with the teachings of the present invention.

Therefore, by utilizing the above described techniques, an additional higher threshold turns on an additional load when exceeded by the output voltage $V_O$ 130, and a second additional higher threshold turns on a second additional load when exceeded by the output voltage $V_O$ 130 in accordance with the teachings of the present invention.

The additional thresholds, which are reference signals $V_{REF1}$ 260 through $V_{REFn}$ 245 in the example described in FIG. 2, can be a scaled representation, or a fixed percentage higher than the regulation threshold reference signal $V_{REF0}$ 265. In this way, the regulation threshold reference signal $V_{REF0}$ 265 itself can be modulated to adjust the power converter 100 output voltage $V_O$ 130 without engaging the additional load circuits. For example, the output voltage $V_O$ 130 can be raised deliberately by adjusting regulation threshold reference signal $V_{REF0}$ 265 to address a higher voltage load requirement. However, as soon as the load is removed, the regulation threshold reference signal $V_{REF0}$ 265 may be reduced to a lower nominal value in order to provide the correct nominal voltage for when a new load is connected to the power supply output. If the reference signals $V_{REF1}$ 260 through $V_{REFn}$ 245 values are set as scaled representations of, or fixed percentages greater than of reference signal $V_{REF0}$ 265, they would not be exceeded during the time the output voltage is deliberately raised, but the additional loading introduced by loads $AL_1$ 215 through $AL_n$ 225 with reference signals $V_{REF1}$ 260 through $V_{REFn}$ 245 brings the output voltage $V_O$ 130 down to the regulation threshold reference signal $V_{REF0}$ 265 value using the additional loading applied by loads $AL_1$ 215 through $AL_n$ 225. The degree of additional loading applied is reduced when switch $S_{ALn}$ 235 opens when the output voltage $V_O$ 130 has been reduced to a level where the reference signal $V_{REFn}$ 245 threshold is no longer exceed by the output sense signal at second terminal 128. The additional loading applied with load $AL_1$ 215 continues to provide additional loading until the output voltage $V_O$ 130 has been brought down to the level where reference signal $V_{REF1}$ 260 is no longer exceeded by the output sense signal at second terminal 128. In other examples, the introduction of hysteresis as is known in the art may modify reference signals $V_{REF1}$ 260 through $V_{REFn}$ 245 such that the additional loading is not removed until the output voltage $V_O$ 130 goes below the level where the additional loading was applied.

Therefore, the additional loading applied by loads $AL_1$ 215 through $AL_n$ 225 with the corresponding additional reference signals $V_{REF1}$ 260 through $V_{REFn}$ 245 act to reduce the output voltage $V_O$ 130 of power converter 100 rapidly down to close to the nominal value despite the fact that no load is actually coupled to the output of power converter 100 in accordance with the teachings of the present invention. Furthermore, the additional loading is applied to clamp the output of power converter 100 through a single first terminal 126 of the secondary control circuit 120 in accordance with the teachings of the present invention. In addition, the same first terminal 126 is also utilized as a supply terminal for voltage regulator circuit 210 to provide the regulated power supply $V_{REG}$ 205 for secondary control circuit 120 in accordance with the teachings of the present invention.

Figure 3:
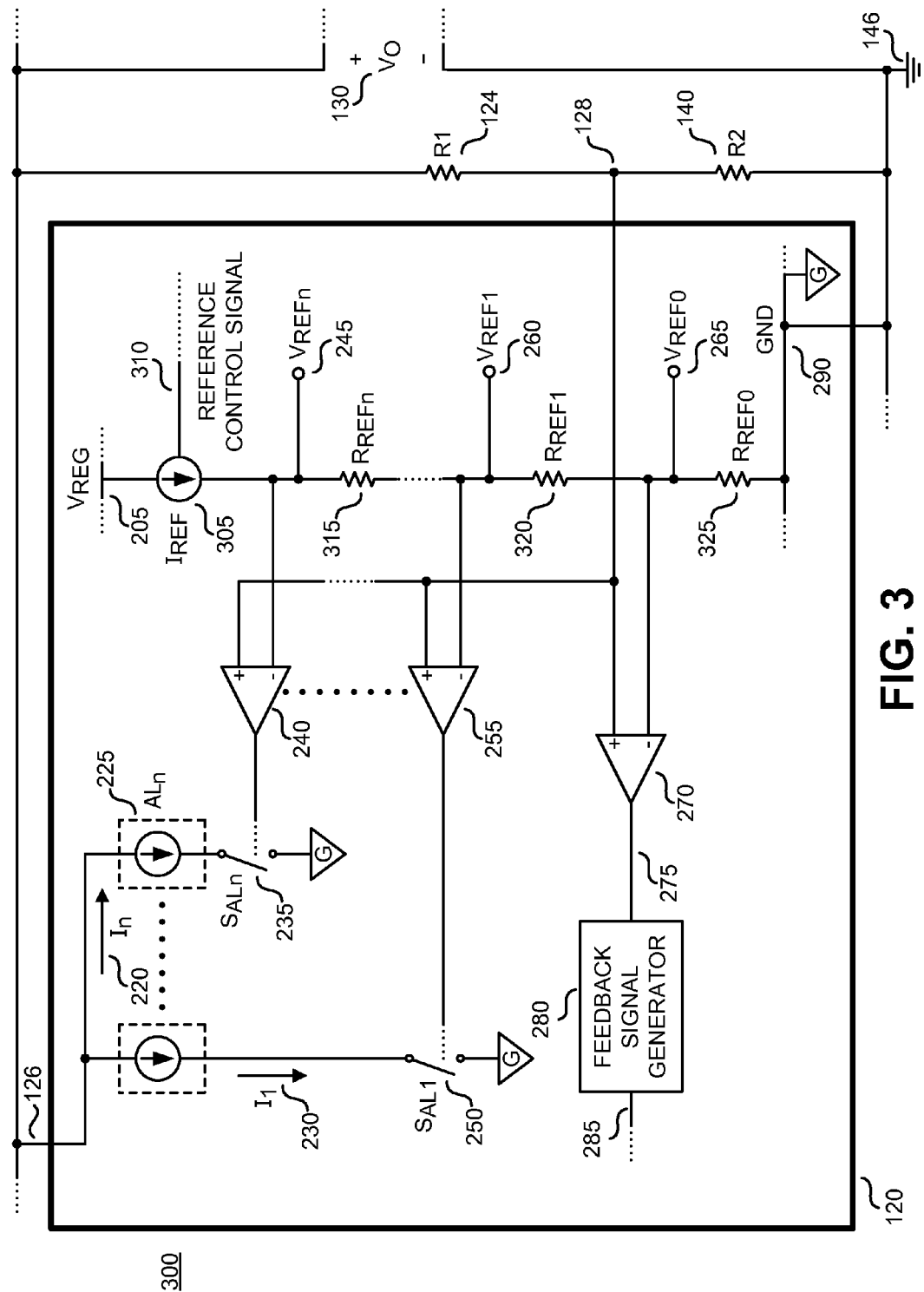
FIG. 3 is a schematic diagram of another example of a secondary control circuit including an output clamp and supply terminal in accordance with the teachings of the present invention.

FIG. 3 is a schematic diagram of an example secondary control circuit 120 including a first terminal 126, which provides a single output clamp and supply terminal in accordance with the teachings of the present invention. In another example, the first terminal may be a dedicated output clamp terminal that is not also a supply terminal to secondary control circuit 120. It is appreciated that the example of secondary control circuit 120 illustrated in FIG. 3 shows some further detail not illustrated in the example of secondary control circuit 120 as described in FIG. 2. For instance, in the example illustrated in FIG. 3, secondary control circuit 120 includes a reference signal generator circuit, which includes a variable current source 305 coupled to a resistor divider circuit including one or more resistors, which are illustrated in FIG. 3 as $R_{REF0}$ 325, and $R_{REF1}$ 320 through $R_{REFn}$ 315 as shown. As shown in the depicted example, variable current source 305 is coupled to receive the regulated power supply $V_{REG}$ 205, which is provided by the voltage regulator circuit 210 coupled to first terminal 126, as illustrated in FIG. 2. In operation, each one of the one or more reference signals $V_{REF0}$ 265, and $V_{REF1}$ 260 through $V_{REFn}$ 245 is generated from a corresponding one of the one or more resistors $R_{REF0}$ 325, and $R_{REF1}$ 320 through $R_{REFn}$ 315 as shown. In the illustrated example, the variable current source 305 is coupled to vary a reference current $I_{REF}$ through the one or more resistors $R_{REF0}$ 325, and $R_{REF1}$ 320 through $R_{REFn}$ 315 of the resistor divider circuit in response to a reference control signal 310 in accordance with the teachings of the present invention.

As mentioned above, there may be a variety of circumstances under which it is desired to adjust the regulation voltage of output voltage $V_O$ 130, such as for example when cable drop compensation is performed, or perhaps when various different types of interchangeable loads having different voltage requirements are connected to the power converter. In operation, the one or more reference signals $V_{REF0}$ 265, and $V_{REF1}$ 260 through $V_{REFn}$ 245 generated by the one or more resistors $R_{REF0}$ 325, and $R_{REF1}$ 320 through $R_{REFn}$ 315 can be deliberately increased, as discussed above, by increasing the reference current $I_{REF}$ in response to reference control signal 310 in accordance with the teachings of the present invention. Similarly, the one or more reference signals $V_{REF0}$ 265, and $V_{REF1}$ 260 through $V_{REFn}$ 245 can be reduced deliberately back down to their lower nominal values, as discussed above, by decreasing the reference current $I_{REF}$ in response to reference control signal 310 in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A secondary control circuit for use in a power converter, comprising:
    a voltage regulator circuit to be coupled to an output of the power converter coupled to provide power to an output load coupled to the output of the power converter, the voltage regulator circuit coupled to provide a regulated power supply of the secondary control circuit;
    one or more switched loads coupled between a first terminal and an output ground terminal of the power converter, wherein the first terminal is to be coupled to the output of the power converter, wherein each one of the one or more switched loads is coupled to switch a respective current from a load current from the output the power converter to provide additional loading on the output of the power converter; and
    one or more comparator circuits coupled to a second terminal, the second terminal coupled to receive an output sense signal representative of an output of the power converter, wherein each one of the one or more comparator circuits is coupled to receive a respective one of one or more reference signals, wherein each respective one of the one or more reference signals is a scaled representation of a first one of the one or more reference signals, and wherein each one of the one or more switched loads is coupled to be switched in response to an output of a respective one of the one or more comparator circuits to switch the respective current from the load current of the power converter to provide the additional loading on the output of the power converter.

2. The secondary control circuit of claim 1 wherein the voltage regulator circuit is coupled to the first terminal.

3. The secondary control circuit of claim 1 wherein a first one of the one or more comparator circuits is coupled to receive the first one of the one or more reference signals, wherein an output of the first one of the one or more comparator circuits is coupled to a feedback signal generator circuit to output a feedback signal representative of the output of the power converter.

4. The secondary control circuit of claim 3 wherein a primary control circuit of the power converter is coupled to control switching of a power switch of the power converter in response to the feedback signal representative of the output of the power converter to regulate the output of the power converter.

5. The secondary control circuit of claim 1 further comprising a reference signal generator circuit coupled the voltage regulator circuit to generate the one or more reference signals.

6. The secondary control circuit of claim 5 wherein the reference signal generator circuit comprises a resistor divider circuit coupled to a variable current source, wherein each one of the one or more reference signals is generated from a corresponding one of one or more resistors of the resistor divider circuit.

7. The secondary control circuit of claim 6 wherein the variable current source is coupled to vary a reference current through the resistor divider circuit in response to a reference control signal.

8. The secondary control circuit of claim 1 wherein each one of the one or more switched loads comprises a current source and a switch coupled between the first terminal and the output ground terminal of the power converter, wherein the switch is coupled to be switched in response to the output of the respective one of the one or more comparator circuits.

9. The secondary control circuit of claim 1 wherein each one of the one or more switched loads comprises a load resistance and a switch coupled between the first terminal and the output ground terminal of the power converter, wherein the switch is coupled to be switched in response to the output of the respective one of the one or more comparator circuits.

10. The secondary control circuit of claim 1 wherein the one or more comparator circuits includes hysteretic comparators.

11. The secondary control circuit of claim 1 wherein the output sense signal is coupled to be received from an output sense circuit coupled to the output of the power converter.

12. The secondary control circuit of claim 11 wherein the output sense circuit coupled to the output of the power converter includes an output resistor divider coupled to generate the output sense signal.

13. A power converter, comprising:
an energy transfer element coupled to an input of a power converter through a power switch and an output of the power converter coupled to provide power to an output load coupled to the output of the power converter;
a primary control circuit coupled to the power switch to control switching of the power switch to regulate the output of the power converter; and
a secondary control circuit coupled to the output of the power converter, the secondary control circuit including:
a voltage regulator circuit coupled to the output of the power converter, the voltage regulator circuit coupled to provide a regulated power supply of the secondary control circuit;
one or more switched loads coupled between a first terminal and an output ground terminal of the power converter, wherein the first terminal is coupled to the output of the power converter, wherein each one of the one or more switched loads is coupled to switch a respective current from a load current from the output the power converter to provide additional loading on the output of the power converter; and
one or more comparator circuits coupled to a second terminal, the second terminal coupled to receive an output sense signal representative of the output of the power converter, wherein each one of the one or more comparator circuits is coupled to receive a respective one of one or more reference signals, wherein each respective one of the one or more reference signals is a scaled representation of a first one of the one or more reference signals, and wherein each one of the one or more switched loads is coupled to be switched in response to an output of a respective one of the one or more comparator circuits to switch the respective current from the load current of the power converter to provide the additional loading on the output of the power converter.

14. The power converter of claim 13 wherein the voltage regulator circuit is coupled to the first terminal of the secondary control circuit.

15. The power converter of claim 13 further comprising an output sense circuit coupled to the output of the power converter to generate the output sense signal coupled to be received by the second terminal of the secondary control circuit.

16. The power converter of claim 15 wherein the output sense circuit coupled to the output of the power converter includes an output resistor divider coupled to generate the output sense signal coupled to be received by the second terminal of the secondary control circuit.

17. The power converter of claim 13 further comprising a bypass capacitor coupled to the voltage regulator circuit of the secondary control circuit.

18. The power converter of claim 13 wherein a first one of the one or more comparator circuits is coupled to receive the first one of the one or more reference signals, wherein an output of the first one of the one or more comparator circuits is coupled to a feedback signal generator circuit of the secondary control circuit to output a feedback signal representative of the output of the power converter.

19. The power converter of claim 18 wherein the primary control circuit is coupled to switch the power switch in response to the feedback signal representative of the output of the power converter to regulate the output of the power converter.

20. The power converter of claim 18 further comprising an opto-coupler included in a feedback link coupled between the primary control circuit and the secondary control circuit.

21. The power converter of claim 13 wherein the secondary control circuit further comprises a reference signal generator circuit coupled the voltage regulator circuit to generate the one or more reference signals.

22. The power converter of claim 21 wherein the reference signal generator circuit comprises a resistor divider circuit coupled to a variable current source, wherein each one of the one or more reference signals is generated from a corresponding one of one or more resistors of the resistor divider circuit.

23. The power converter of claim 22 wherein the variable current source is coupled to vary a reference current through the resistor divider circuit in response to a reference control signal.

24. The power converter of claim 13 wherein each one of the one or more switched loads comprises a current source and a switch coupled between the first terminal and the output ground terminal of the power converter, wherein the switch is coupled to be switched in response to the output of the respective one of the one or more comparator circuits.

25. The power converter of claim 13 wherein each one of the one or more switched loads comprises a load resistance and a switch coupled between the first terminal and the output ground terminal of the power converter, wherein the switch is coupled to be switched in response to the output of the respective one of the one or more comparator circuits.

26. The power converter of claim 13 wherein the one or more comparator circuits includes hysteretic comparators.

27. The power converter of claim 13 further comprising an output capacitor coupled to the output of the power converter.

28. The power converter of claim 13 wherein the output of the power converter is to be coupled to the output load through a cable.

* * * * *